July 4, 1939.  M. BEAUDRY  2,164,982
SMOKING PIPE
Filed Sept. 13, 1938

Inventor
Marcel Beaudry,

By Clarence A. O'Brien
and Hyman Berman
Attorneys

Patented July 4, 1939

2,164,982

UNITED STATES PATENT OFFICE 2,164,982

SMOKING PIPE

Marcel Beaudry, Irasburg, Vt.

Application September 13, 1938, Serial No. 229,727

2 Claims. (Cl. 131—225)

The invention illustrated in the accompanying drawing and about to be described and claimed, pertains to smoking pipes, having reference in particular to a flexible so-called, non-breakable joint between complemental bowl and mouth stem units.

As implied by the introductory general statement of the invention, I am aware that flexible non-breakable joint constructions are not broadly new. Therefore, the subject matter under consideration pertains to what is believed to be an improved joint construction, the same being characterized by companion bushings keyed together, the bushings being arranged to accommodate a special filtering member and an associated jointing spring.

It is therefore the object of this invention to generally improve upon prior patented and marketed pipe joint constructions by adopting and associating an assemblage of appropriate features aptly fitted to accomplish the desired result and suitable in providing a simple and economical sectional pipe stem construction.

Other features and advantages may become apparent from the following description and the accompanying drawing.

In the drawing, wherein identical reference numerals designate and distinguish identical parts:

Figure 1:
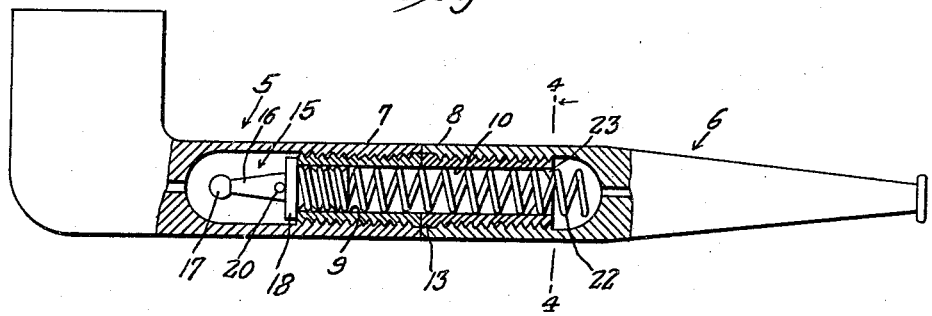
Figure 1 is a side view of what appears externally as a conventional smoking pipe, portions thereof being broken away and shown in section to reveal the details and arrangements of the improved separable but non-breakable joint.
Figure 2:
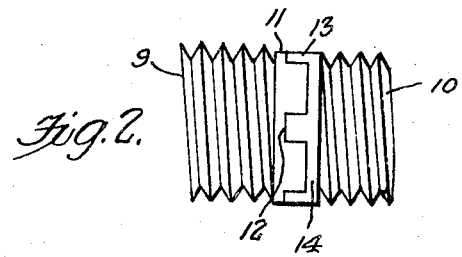
Figure 2 is an enlarged fragmentary elevational view disclosing the construction and connection of the companion threaded bushings.
Figure 4:
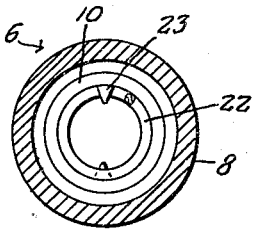
Figure 4 is an enlarged cross section on the line 4—4 of Figure 1.
Figure 3:
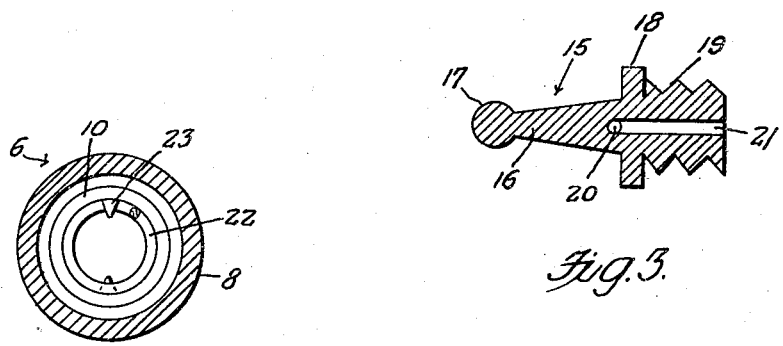
Figure 3 is an enlarged longitudinal sectional view through the smoke regulating and filtering stud or unit.

In the drawing, the bowl section 5 includes a hollow stem portion cooperable with the complemental mouthpiece or stem portion 6. The abutting end portions are hollowed out to provide the desired chamber to accommodate the mechanism of the invention. Adjacent the abutting ends the parts 7 and 8 are internally screw-threaded to allow the companion bushings 9 and 10 to be screwed in place. The collar 11 on the bushing 9 is provided with circumferentially spaced keeper or retention notches 12 receiving detent lugs or keys 13 on the corresponding collar portion 14 of the bushing 10. This provides the desired interlocking feature to permit the bushings to be separated in an endwise direction while at the same time preventing relative rotation.

The headed filtering stud unit 15 embodies a shank 16 with a terminal head 17 the shank being tapered and provided with a shoulder forming flange 18. Beyond this the structure is formed into a threaded extension 19. The smoke intake port or orifice 20 communicates with the smoke conveying bore or passage 21.

It is to be noted that the unit 15 is supported in the bushing 9. That is to say, the abutment flange 18 rests against one end of the bushing while the threaded extension 19 projects into the bushing. The threads on the stem serve to accommodate the convolutions or coils on one end of the coiled spring 22. The spring extends on through both bushings and the coils at the opposite end are held in place by inwardly projecting or radial detents 23 carried by the adjacent end portion of the bushing 10. Thus the detents 23 are "threaded" home on the coils of the spring to put the spring under tension and to thus flexibly adjoin the two bushings together. The resiliency of the spring is obviously such as to permit two sections or units 5 and 6 of the pipe to be pulled apart under due stress and strain so that by proper manipulation the coils of the spring tend to clean and dislodge accumulations such as might collect in the bushings. Moreover, by thus separating the sections 5 and 6 sufficiently to disconnect the keys 13 from the keeper notches or keyways 12, the section 6 can be backed off of the spring to completely disjoin the parts for repair or cleaning.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a smoking pipe construction of the class described, a bowl having a stem portion, a complemental stem portion provided with a mouthpiece, adjacent ends of said stem portions being disposed in separable abutting relationship, companion bushings fitted into the respective stem portions, the adjacent ends of said bushings being separably keyed together.

2. As a new article of manufacture and a component part of a pipe construction, a bushing provided at one end with a collar having keeper notches, a second bushing having keying detents fitting removably in said notches, the second bushing being provided at its outer end with detents radially projecting into the bore thereof, a filtering unit having a threaded extension projecting into the first named bushing, a coiled spring having predetermined convolutions fastened on the threads of said extension, the convolutions at the opposite end of said spring being cooperable with said detents in the manner and for the purposes described.

MARCEL BEAUDRY.